June 7, 1938. H. LIST 2,119,819
BRAKE
Filed Dec. 22, 1936 2 Sheets-Sheet 1
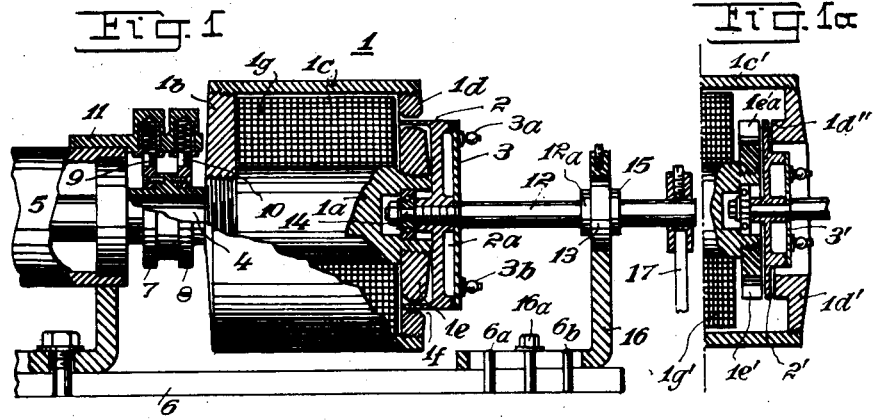
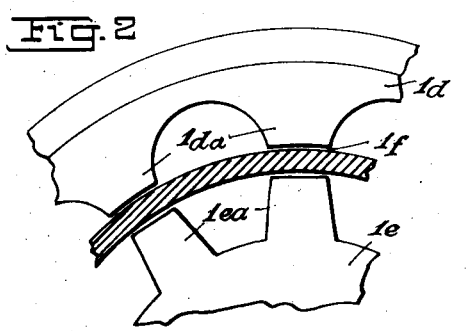
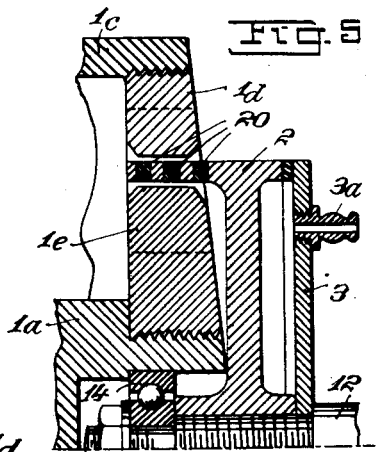
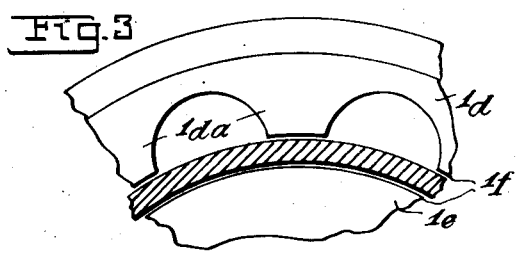
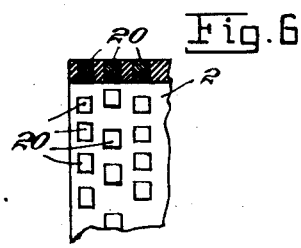
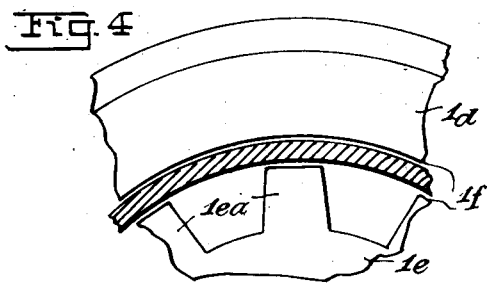
Inventor:
Heinrich List,
by John D. Brady
Attorney June 7, 1938.  H. LIST  2,119,819
BRAKE
Filed Dec. 22, 1936  2 Sheets-Sheet 2
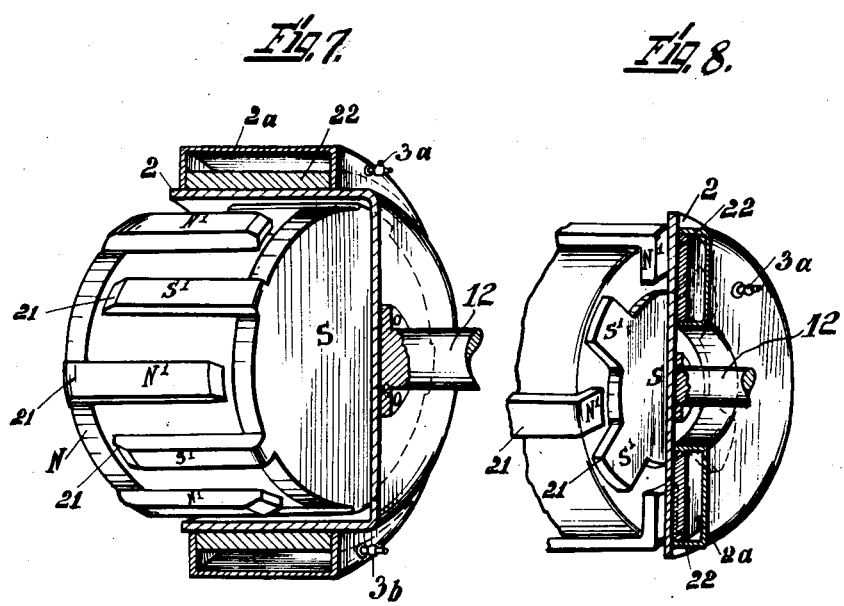
Inventor:
Heinrich List,
by John B. Brady
Attorney Patented June 7, 1938

2,119,819

UNITED STATES PATENT OFFICE 2,119,819

BRAKE

Heinrich List, Berlin-Lichterfelde-Ost,
Germany

Application December 22, 1936, Serial No. 117,193
In Germany March 11, 1935

15 Claims. (Cl. 188—104)

This invention relates to heavy duty brakes. By the expression "heavy duty brakes" is meant brakes, for example vehicle brakes or the brakes in brake-test apparati, which serve to absorb considerable energy.

An object of the invention is to provide a brake comprising a rotatable electromagnet including a flux conductor with an air gap in which a plurality of working poles on said conductor form a plurality of magnetic streams, an eddy current member located in said streams, a chamber in said eddy current member, inlet and outlet means in said chamber for a flow of cooling liquid, means for connecting said electromagnet to a rotating driving member and means for connecting said eddy current member to a resistant so that it remains stationary.

As compared with known brake dynamometers, a brake in accordance with the invention, has the advantage of an essentially smaller and cheaper construction for equal capacity. This advantage arises more especially from the fact that the stationary eddy current member can be easily supplied with an adequate cooling flow without turbulence because it remains stationary. The working poles give a rapidly varying field proceeding in the direction of relative rotation between the electromagnet and the eddy current member and this also increases the braking capacity of the apparatus.

The further details of the invention are to be found in the following description of the embodiments shown by way of example in the drawings.

Referring to the drawings:—

Fig. 1 shows the first embodiment in side elevation and partly in section.

Fig. 1a shows a second embodiment, which, as regards the parts shown in this figure, differs from the embodiment in Fig. 1, but otherwise corresponds.

Figs. 2 to 4 are views of different embodiments of the ring gap-containing part of the field magnet of the embodiment in Fig. 1.

Fig. 5 is an axial section of an embodiment differing from the embodiment in Fig. 1 as regards the formation of the eddy current member, but otherwise corresponding with it.

Fig. 6 shows a part of the eddy current member of Fig. 5 in detail.

Figs. 7 and 8 are part perspective views of two further examples.

As already indicated above, the novel heavy duty brake is also especially intended for so-called brake test apparati, as used, for example, in determining the output of motors and the like. Fig. 1 shows the new brake with a fitting suitable for application to this purpose. The electromagnet $I$ serves to create the braking force. In the example, it is made in the form of a pot-shaped magnet. Its iron flux path comprises the core $Ia$, the body part $Ib$ attached, for example, to the latter by screwing, the cylindrical cover part $Ic$ screwed to the body part $Ib$, the ring-shaped pole shoe $Id$ screwed to the cover part $Ic$ and the disc shaped pole shoe $Ie$ which is screwed to, or otherwise similarly connected with, the core $Ia$. The pole shoes $Id$ and $Ie$ enclose a ring-shaped gap $If$ between them. The surfaces of the pole shoes $Id$ and $Ie$ facing this gap may be formed as shown in the enlarged detail views of Figs. 2 to 4. In the modification according to Fig. 2 working poles $Ida$ and $Iea$ are formed at both sides of the air gap $If$, that is, on the pole shoe $Id$ as well as on the pole shoe $Ie$. The expression "working poles" is intended to convey that it is not a question of the polarity of the poles concerned, but that it relates to poles by means of which the magnetic flux is divided into part streams and so conducted to the other pole shoe. In short, it is a question of creating a strong changing field by forming a plurality of working poles round the ring gap $If$, whereby a high braking load by the use of a form of magnet having a ring gap, is made possible.

In the modification according to Fig. 3, the pole shoe $Ie$ terminates cylindrically at the edge facing the ring gap $If$, and only the pole shoe $Id$ is provided with working poles. Reversely, in the modification according to Fig. 4, the pole shoe $Ie$ is provided with working poles on the edge facing the ring gap, while the pole shoe $Id$ terminates cylindrically at the edge facing the ring gap.

The numeral $Ig$ denotes the exciting winding which is enclosed by the iron flux path of the magnet.

The eddy current member 2, which is formed as a cylinder, projects into the ring gap $If$. It may consist of copper or a like material of the best possible electrical conductivity. Between the body of the eddy current cylinder 2 and a disc 3 connected thereto, there is a chamber $2a$ into and from which water or a like cooling medium can be led and withdrawn through the connections $3a$, $3b$.

The field magnet $I$ is rotatably mounted by means of a shaft 4 constituting an extension of the magnet core $Ia$ and a bearing arrangement 5, which is connected with the base plate 6. A coupling is provided on the part of the shaft 4 which projects beyond this bearing arrangement 5 and which is not shown in the drawings, said coupling enabling the field magnet to be coupled to the apparatus to be braked, for example, an electric motor.

The exciting current is led to the winding $1g$ by two slip rings 7 and 8 and the two brushes 9 and 10, the former being mounted on the shaft 4 with suitable intervening insulation, and the common holder 11 for the brushes being carried by the bearing arrangement 5.

The unit consisting of the eddy current cylinder and the disc 3 connected thereto is attached to the front end of a shaft 12 by a screw or the like connection. The shaft is mounted at one end in the bearing 13 and mounted at the other end by a ball bearing, which is longitudinally movable in a cavity of the core $1a$. A collar $12a$ on the shaft 12 and a positioning ring 15 secure the shaft 12 and the parts connected therewith against an axial movement relatively to the pedestal bearing 16 carrying the bearing 13. The usual lever 17 of brake test apparatus is connected to the end of the shaft 12 projecting beyond the bearing 13, which lever serves for the suspension of the weight by means of which the torque on the brake cylinder 2 is compensated.

The braking force generated depends upon the depth to which the brake cylinder 2 projects into the ring gap $1f$. Therefore, in order to make it possible to adjust the braking force, provision is made in apparatus according to the invention, whereby the depth to which the brake or eddy current cylinder 2 projects can be altered. To this end, the bearing pedestal 16 has a slot guide engaging the projections $6a$ and $6b$ on the base plate 6, so that upon loosening the screwed bolt $16a$ the bearing pedestal 16 can be adjusted in the direction of the shaft 12. It is secured in the new position by tightening the bolt $16a$. On being adjusted in the direction of the shaft 12 the pedestal bearing 16 carries this shaft 12 and the parts connected with it. Thereupon the ball bearing 14 is adjusted in the recess provided for it in the core $1a$. A second pedestal mounting connected with the base plate is provided at the left-hand side of Fig. 1 for the shaft 4 of the magnet core $1a$ which accommodates the bearing 14 of shaft 12. The illustrated embodiment, in which the bearing 14 or, more generally stated, the second bearing for the shaft 12 is carried by the core $1a$ of the field magnet, has the advantage that, in the above manner, a very exact adjustment of the eddy current member 2 with reference to the ring gap $1f$ can be obtained, whereby in addition, the possibility is afforded of making the clearance between the eddy current member 2 and the pole shoes $1d$ and $1e$ very small, this being extremely desirable.

The eddy current member 2 is made, for example, of copper, firstly, on account of the good electrical conductivity of copper and secondly because copper has a very high heat conductivity. Heating of the copper is naturally to be expected in the present case of a heavy duty brake. The brake may even be so highly loaded that possibly the cooling water led in at the connection $3a$ leaves as steam at the connection $3b$.

In place of an eddy current cylinder, naturally an eddy current disc can be used, as is shown according to the detail view Fig. 1a. This embodiment can be visualized from that according to Fig. 1, inasmuch as the iron cover $1c'$ is lengthened in the direction of the shaft 12 and the pole shoe $1d'$ is lengthened in a direction at right angles to that of shaft 12. In this way an air gap is formed, which is suited for the reception of an eddy current disc $2^1$ in the manner indicated in Fig. 1a. Said disc can also be provided, like the embodiment in Fig. 1, with a disc $3^1$ in order to form a flow chamber for the cooling medium. The pole shoe $1e^1$ of Fig. 1a is provided peripherally with teethlike working poles $1e^1, a$, similar to those in Figs. 2 and 4. The pole shoe $1d^1$ can be completed by a ringlike projection $1d^{11}$. The part $1d^{11}$ may also be toothed, in which case the arrangement for dividing the flux will correspond to that in Fig. 2. The other parts of the modification according to Fig. 1a may, as already mentioned, be the same as in Fig. 1, and therefore there is no need to show them in Fig. 1a.

It has already been mentioned that the ring gap $1f$ should be as small as possible and, for similar reasons, it is desirable to keep the magnetic reluctance of the ring gap as small as possible. On the other hand, the reduction in the width of the air gap is naturally limited to the desired load capacity of the brake and also to the attainable manufacturing accuracy.

An embodiment is shown in Figs. 5 and 6 in which, with the same gap width and the same thickness of eddy current cylinder, there is, however, an essentially smaller air gap reluctance. This is attained, in accordance further with the invention, in that the body forming the eddy current member—the eddy current cylinder 2 in the example shown—has pieces 20 of high magnetic conductivity or permeability, of iron for example, positioned therein. They are not distributed regularly. On the contrary they can be "strewn" in a certain manner irregularly in the eddy current member located in the magnetic field. In Figs. 5 and 6 fairly compact separate pieces of diamagnetic material are located. Instead of this, iron turnings or filings can be located in greater or smaller proportions in the copper mass. The embedded diamagnetic parts have the effect of creating a good conducting path for the magnetic flux. On the other hand, these parts are surrounded by the copper or the like good electrical conducting material of the eddy current cylinder so that the whole body constitutes, on the one hand, a good conducting body for the magnetic flux and on the other, an exceptionally good conducting body for the electric current. The remaining structure of the example according to Figs. 5 and 6 may be exactly according to Figs. 1 to 4 and is therefore not further shown in Figs. 5 and 6. In the above described examples the field magnet has a driving connection with the part to be braked, while the eddy current member, with reference to the drive substantially remains stationary. This arrangement is especially advantageous when very great cooling is desired, and this cooling, for example, is effected by a cooling liquid. These arrangements in which the eddy current member remains stationary with reference to the drive have the advantage that the cooling fluid can be especially easily led in, and away and there is no turbulence or the like undesirable effects as would be the case if the eddy current member rotated.

Figs. 7 and 8 illustrate two examples in which the eddy-current member 2 again is stationary and the magnetic field is ring-shaped, being derived from a rotatable magnet structure of which the N and S poles are provided with a number of bar-shaped extensions 21 which are so located and spaced round the circumference that they surround the field winding of the magnet and the individual extensions of the north and south poles N, S are located side by side as alternate north and south poles, N' and S', from which a plurality of angularly disposed magnetic streams are emitted or radiated. In Fig. 9 the south pole disc S is formed with a core extension (not shown) on which the magnetic windings (not shown) are mounted. The north pole disc N is attached to the other end of the core which thus holds the north and south poles together.

The eddy current member is located over this pole arrangement and receives first of all on its outer surface, an iron flux attractor and conductor 22, which, for example, is an iron ring mounted on the eddy current member.

If it is desired to dispense with the arrangement of the poles round the circumference of the winding, then it can be arranged that only one pole, for example the north pole N, is provided with the surrounding extensions 21, which are extended to the side with the south pole S. The south pole S itself has now only short projections or notch-shaped indentations which are formed as south poles S', as can be seen from Fig. 10. Thus there are alternately south poles S' and north poles N' in the same plane. In this example, the eddy current member is constructed as in Fig. 1a but is also provided with an iron flux attractor and conductor 22, which is located in the outer side thereof. In both the last described embodiments, the cooling is effected by liquid passing through the chamber 2a, the inlets and outlets being denoted by 3a and 3b.

I claim:

1. A brake comprising an electromagnet of which the flux path includes an end wall having inner and outer spaced parts constituting a narrow, annular air gap between them, an eddy current member facing said wall and having a projection adapted to project into said gap, conduit means in said member and a cooling fluid in said conduit means, means on which said electromagnet and eddy current member are relatively rotatably mounted and means for effecting relative adjustment between said eddy current member and electromagnet so that the extent to which said projection projects into said gap can be adjusted.

2. A brake comprising an electromagnet of which the flux path includes an end wall having inner and outer parts each terminating in a series of projections or working poles, the projections on one part being opposed to and spaced from the projections of the other part to constitute a circular series of narrow air gaps, an eddy current member facing said wall and having a projection adapted to project into said gaps, conduit means in said member adapted to receive a flow of cooling liquid, means on which said electromagnet is rotatably mounted, means for connecting the eddy current member to a resistant so that it does not rotate with the electromagnet and means for effecting relative adjustment between said eddy current member and electromagnet so that the extent to which said projection projects into said gaps can be adjusted.

3. A brake comprising an electromagnet of which the flux path includes an end wall having inner and outer parts, the inner part terminating in a series of projections or working poles, the projections being opposed to and spaced from the outer part to constitute a circular series of narrow air gaps, an eddy current member facing said wall and having a projection adapted to project into said gaps, conduit means in said member adapted to receive a flow of cooling liquid, means on which said electromagnet is rotatably mounted and means for effecting relative adjustment between said eddy current member and electromagnet so that the extent to which said projection projects into said gaps can be adjusted.

4. A brake comprising an electromagnet of which the flux path includes an end wall having inner and outer parts, the outer part terminating in a series of projections or working poles, the projections being opposed to and spaced from the inner part to constitute a circular series of narrow air gaps, an eddy current member facing said wall and having a projection adapted to project into said gaps, conduit means in said member and a cooling fluid in said conduit means, means on which said electromagnet is rotatably mounted and means for effecting relative adjustment between said eddy current member and electromagnet so that the extent to which said projection projects into said gaps can be adjusted.

5. A brake comprising an electromagnet of which the flux path includes spaced parts constituting an annular magnetic field in the air, an eddy current member located in said field, a plurality of pieces of high magnetic conductivity in said member, conduit means in said member and a cooling fluid in said conduit means, and means on which said electromagnet is rotatably mounted and means for preventing the rotation of said eddy current member.

6. A brake comprising a rotatable electromagnet including a flux conductor terminating in opposed spaced faces having working poles constituting an annularly disposed magnetic field in the air which varies in intensity, an eddy current member located in said field, a chamber in said eddy current member, inlet and outlet means in said chamber for a flow of cooling liquid, means for connecting said electromagnet to a rotating driving member and means for connecting said eddy current member to a resistant.

7. A brake comprising a rotatably mounted pot-shaped electromagnet including a flux conductor consisting of a core, end walls and an outer wall, one end wall having inner and outer spaced pieces shaped to constitute an annular series of narrow air gaps forming a plurality of magnetic streams, an eddy current disc facing said lastmentioned end wall and having a flange thereon adapted to project into said air gaps, and a chamber therein with inlet and outlet means for a flow of cooling liquid, an axially adjustable shaft for said eddy current member, a recess in said core for slidably and rotatably receiving an end of said shaft and means for connecting said shaft to a resistant to prevent rotation thereof.

8. A heavy duty brake comprising an electromagnet including a flux conductor having an end wall with an air gap therein, a bearing in which said electromagnet is rotatably mounted, an eddy current disc having a flange at one side projecting into said air gap and a further flange, a closure plate attached to said further flange to constitute a chamber and inlet and outlet apertures for liquid in said plate, said air gap being bounded by inner and outer flux-conducting pieces shaped to constitute an annularly spaced series of narrow air gaps and means for connecting said eddy current member to a resistant.

9. A heavy duty brake comprising a rotatable electromagnet including an end wall having an inner and outer part spaced from each other, each part terminating in a series of projections or working poles, the projections on one part being opposed to and spaced from the projections on the other part to constitute a circular series of narrow air gaps, an eddy current member facing said wall and having a flange projecting into said air gaps, a chamber in said member and inlet and outlet means in said chamber for a flow of cooling liquid and means for connecting said eddy current member to a non-rotatable resistant.

10. A heavy duty brake comprising a rotatable electromagnet including a flux conductor consisting of end pieces with interengaging spaced projections constituting a cylindrical series of alternate north and south poles which emit a plurality of angularly disposed magnetic streams, a cylindrical eddy current member surrounding said series of poles, a chamber in said member, inlet and outlet means on said chamber for a flow of cooling liquid, and an iron member in said chamber, said eddy current member being connectible to resistant means to prevent rotation thereof.

11. A brake comprising a rotatable electromagnet including a flux conductor terminating in opposed spaced faces having projections constituting an annular series of magnetic streams in the air gap, an eddy current member having a flange adapted to project into said air gap, a chamber in said eddy current member, inlet and outlet means in said chamber for a flow of cooling liquid, means for connecting said electromagnet to a rotating driving member and means for connecting said eddy current member to a resistant, said flange having a plurality of pieces of high magnetic conductivity embedded therein.

12. A heavy duty brake comprising a pot shaped electromagnet consisting of a core, end walls and an outer wall forming a flux path and an exciting winding round said core, a bearing in which said magnet is rotatably mounted, slip rings for supplying current to said winding, an air gap in one end wall bounded by inner and outer circular flux-conducting pieces shaped to constitute between them a circular series of narrow air gaps, a copper eddy current disc having a flange at one side projecting into said gaps and a flange at the other side to which a closure plate is attached to constitute a chamber for liquid, an inlet and outlet for the liquid in said plate, a shaft for said disc, a recess in said core, an anti-friction bearing on an end of said shaft engaging slidably and rotatably in said recess, a further bearing for said shaft, means for longitudinally adjusting the bearing, shaft and disc and resistant means connected to said shaft to prevent rotation of said disc.

13. A heavy duty brake comprising a pot shaped electromagnet consisting of a core, end walls and an outer wall forming a flux path and an exciting winding round said core, a bearing in which said magnet is rotatably mounted, slip rings for supplying current to said winding, an air gap in one end wall bounded by inner and outer circular flux-conducting pieces shaped to constitute 10 between them a circular series of narrow air gaps, a copper eddy current disc having a flange at one side projecting into said gaps and a flange at the other side to which a closure plate is attached to constitute a chamber for liquid, an inlet and outlet for the liquid in said plate, a plurality of iron pieces embedded in said firstmentioned flange, a shaft for said disc, a recess in said core, an anti-friction bearing on an end of said shaft engaging slidably and rotatably in said recess, a further bearing for said shaft, means for longitudinally adjusting the bearing, shaft and disc and resistant means connected to said shaft to prevent rotation of said disc.

14. A heavy duty brake comprising a pot shaped electromagnet consisting of a core, end walls and an outer wall forming a flux path and an exciting winding round said core, a bearing in which said magnet is rotatably mounted, slip rings for supplying current to said winding, an air gap in one end wall bounded by inner and outer circular flux-conducting pieces shaped to constitute between them a circular series of narrow air gaps, a copper eddy current disc having a part projecting into said gaps and a flange to which a closure plate is attached to constitute a chamber for liquid, an inlet and outlet for the liquid in said plate, a shaft for said disc, a recess in said core, an anti-friction bearing on an end of said shaft engaging slidably and rotatably in said recess, a further bearing for said shaft, means for longitudinally adjusting the bearing, shaft and disc and resistant means connected to said shaft to prevent rotation of said disc.

15. A brake comprising a rotatable electromagnet including a flux conductor with an air gap in which a plurality of working poles on said conductor form a plurality of magnetic streams, an eddy current member located in said streams, a chamber in said eddy current member, inlet and outlet means in said chamber for a flow of cooling liquid, means for connecting said electromagnet to a rotating driving member and means for connecting said eddy current member to a resistant so that it remains stationary.

HEINRICH LIST.